United States Patent Office 3,075,449
Patented Jan. 29, 1963

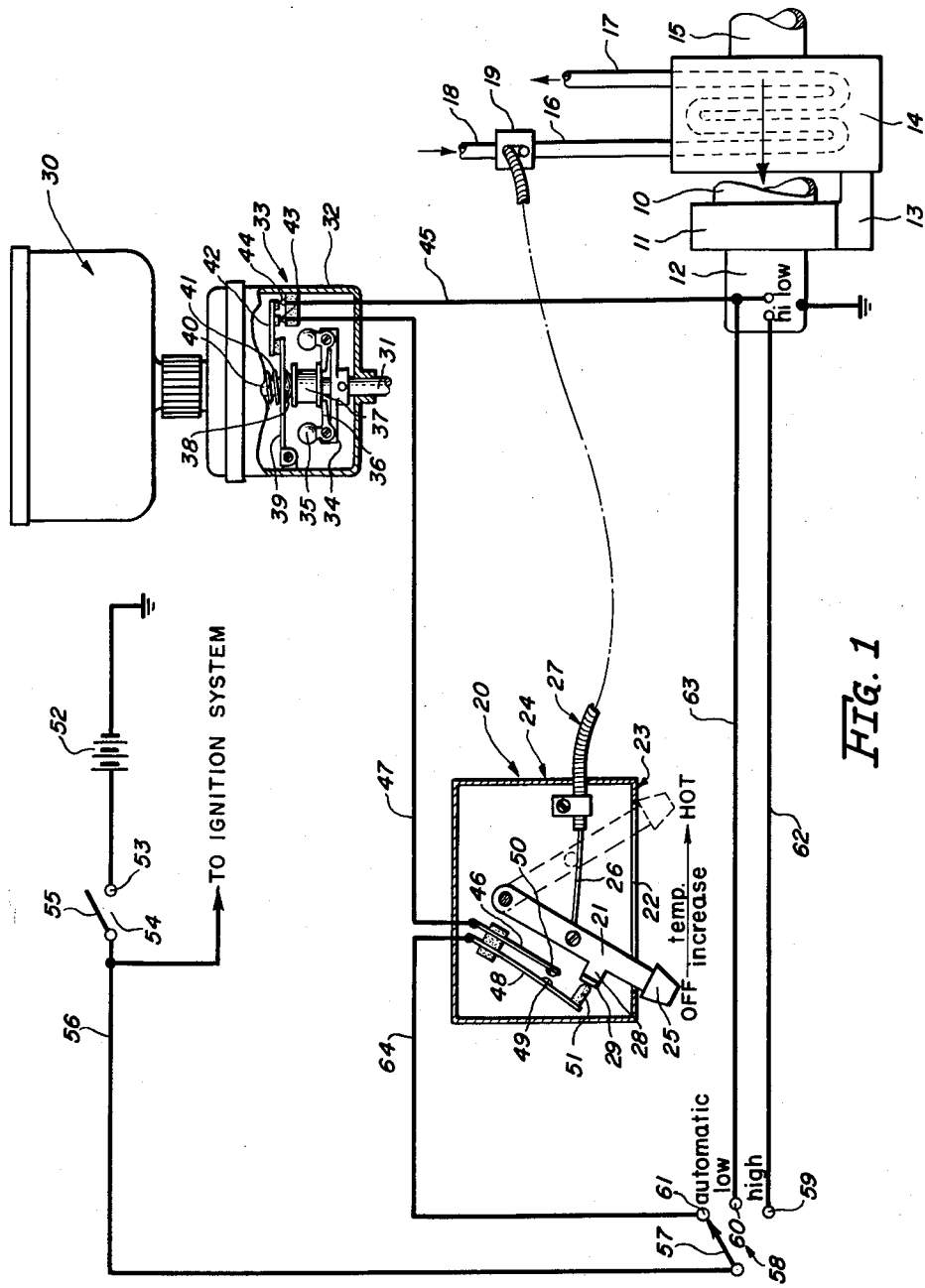

3,075,449
BLOWER CONTROL MEANS FOR MOTOR VEHICLE HEATING AND VENTILATING SYSTEMS
Adna R. Clark, Fort Wayne, Ind., assignor to International Harvester Company, Chicago, Ill., a corporation of New Jersey
Filed July 17, 1959, Ser. No. 827,816
5 Claims. (Cl. 98—2)

This invention is concerned with blower control means for motor vehicle heating and ventilating systems and more particularly to means for controlling the operation of the blower of a motor vehicle heating and ventilating system in accordance with the speed of the vehicle and the temperature within the enclosed operator's compartment.

The heating and ventilating apparatus used in the vast majority of present day motor vehicles usually includes a heat exchanger having a core through which heated coolant from the engine cooling system is circulated at a regulated rate of flow. The air temperature within the enclosed operator's compartment is partially dependent upon the volume and temperature of the air emitted into the operator's compartment from the heat exchanger after passing thru the heat exchanger core. The volume of the air flowing from the heat exchanger and the distribution thereof within the operator's compartment is proportional to the pressure of the air within the heat exchanger in relation to the air pressure within the operator's compartment. Consequently, vehicle manufacturers have designed the heating and ventilating apparatus to take advantage of the so-called "ram effect" on the forwardly facing surfaces of the vehicle when the vehicle is in motion by providing a duct having an end thereof in a forwardly facing area of the vehicle and the opposite end of the duct in air communication with the heat exchanger such that when the vehicle is in motion, the impact air pressure within the heat exchanger is greater than the air pressure within the operator's compartment and air flow in the operator's compartment from the heat exchanger is induced. However, to insure an adequate air pressure differential between the air in the heat exchanger and within the operator's compartment for proper circulation of air into the vehicle body when the vehicle is being driven at relatively low speeds or is standing, a power driven blower is required to force the air into the heat exchanger and thus into the operator's compartment.

The air circulating blower of the typical heating and ventilating apparatus mentioned above is usually driven by an electric motor and the electrical circuits for operating the motor, in turn, are controlled by a manually operated switch. Obviously to maintain the temperature within the operator's compartment substantially constant, it is necessary that a continuous flow of air at a particular velocity flow from the heat exchanger. Heretofore, in order to maintain the continuous flow of air from the heat exchanger the blower had to be run at all times during the operation of the vehicle or the vehicle operator had the vexatious task of continually manually operating the switch to turn the blower on each time the vehicle speed was reduced below the speed necessary to insure adequate air circulation within the operator's compartment and to thereafter turn the blower off when the vehicle is being driven above such speed. It is, therefore, the primary objective of the present invention to obviate the necessity of manually controlling the operation of the blower motor to afford proper circulation of air within the operator's compartment under all kinds of driving conditions.

Another object is the provision of an automatic control of a motor vehicle heating and ventilating apparatus air circulating blower which is responsive to the speed of the motor vehicle.

Still another object is the provision of an air circulating blower control circuit having a switch incorporated therein mechanically connected to the heat exchanger thermostat control, the condition of the switch being dependent upon the setting of the thermostat control.

A further object is the provision of an inexpensive and unique circuit for controlling the operation of a motor vehicle air circulating blower which automatically controls the operation of the blower in accordance with vehicle speed and the temperature of the air required in the operator's compartment.

The foregoing and other objects and desirable features inherent in and encompassed by the invention together with many of the purposes and uses thereof will become readily apparent from a reading of the ensuing description in conjunction with the annexed drawing wherein:

FIGURE 1 is a somewhat diagrammatic view of a motor vehicle heating and ventilating apparatus embodying the invention, certain switches for controlling the blower motor circuit being in section.

Referring to the drawing in detail, reference character 10 designates the rearwardmost end of an air inlet duct or air scoop duct. As in conventional installations, the forwardmost end, not shown, of the air scoop duct 10 is arranged to face forwardly for permitting air to be forced or rammed into the air scoop duct 10, as indicated by an arrow, when the vehicle is in motion. The rearwardmost end of the air scoop duct 10 is in air communication with the inlet of an air circulating blower 11 which is operated by a two-speed electric motor 12 having low and high speeds. Leading from the blower 11 is a discharge duct 13 which is in communication with the interior of a heat exchanger housing 14. The air entering the heat exchanger housing 14 through the duct 13 passes over a heat exchanger core, shown diagrammatically in broken lines, and is discharged to the interior of the operator's compartment through a duct 15, in a well known manner. The heat exchanger core is provided with supply and return conduits 16, 17, respectively, for the heating medium such as hot water or coolant from the engine cooling system. The hot water or coolant used as a source of heat is generally derived from the engine cylinder head and is conducted by a conduit 18 to a thermostatically-controlled valve 19. The control valve 19 is thermostatically operable to secure a required water flow through the heat exchanger core to effect the selected degree of heating of the air flowing from the heat exchanger housing 14 through the discharge duct 15.

The manually operable control mechanism, designated generally by numeral 20, for adjusting the setting of the thermostatically-controlled valve 19 and thus the temperature of the air entering the operator's compartment from the discharge duct 15 includes a lever 21 mounted for pivotal movement. It is to be understood that while a particular manually operable control mechanism 20 is shown and will be described in detail similar mechanisms may be employed without departing from the spirit or scope of the invention. The lever 21 extends through a slot 22 formed in a wall 23 of the housing 24 of the control mechanism 20. The end of the lever 21 projecting outwardly of the wall 23 is provided with a knob or control piece 25 which is conveniently grippable by the vehicle operator for pivoting the lever 21. One end of the inner slidable wire 26 of a Bowden wire 27 is connected to the lever 21 intermediate its ends and the opposite end of the wire 23 is operatively connected to the valve 19. The outer surface of the wall 23 bears suitable indicia of a temperature setting scale whereby the condition of the valve 19 is indicated by the position of the knob 25 with reference to the indicia. Thus the valve 19 is in its closed position when the knob 25 is in the position as shown in FIGURE 1 and the valve 19 is in its fully open condition when the knob 25 and lever 21 are in the dotted line position. The lever 21 is provided with an L-shaped extension 28, one leg 29 of which serves as an abutment. The purpose of the abutment 29 will be pointed out hereinafter.

Reference character 30 is used to designate a vehicle speed indicating device such as a speedometer. The speed indicating device 30 includes a drive shaft 31, the speed of rotation of which is in direct proportion to vehicle ground speed. Encircling the drive shaft 31 is the housing 32 of a speed responsive switch designated generally by numeral 33. Attached to the drive shaft 31 within the housing 32 so as to be rotatable therewith is a plate 34 having a pair of ball-like weights 35 pivotally connected thereto. Each weight 35 has an arm 36 integrally formed therewith which bears against the underside of a sleeve 37. The sleeve 37 is capable of sliding axially with respect to the drive shaft 31. Bearing on the top side of the sleeve 37 is a semi-spherical abutment 38 which is fixed to the underside of a lever 39. Extending upwardly from the lever 39 in vertical alignment with the abutment 38 is a spring guide 40. Encircling the spring guide 40 is a helically-wound compression spring 41 which has one end bearing against the upper surface of the lever 39, as viewed in FIGURE 1, and its opposite end, not shown, reacting against the interior of the housing 32. One end of the lever 39 is pivotally supported on the interior of the housing by suitable means. From the foregoing it will be appreciated that the spring 41 continually biases the lever 39 in a clockwise direction, as viewed in FIGURE 1, to cause the sleeve 37 to be yieldably urged axially downwardly against the force applied to the sleeve 37 by the weights 35 acting through the intermediary of the arms 36.

From the foregoing it will be appreciated that because of centrifugal force as the rotational speed of the drive shaft 31 increases, the ball weights 35 move radially outwardly and consequently the arms 36 force the sleeve 37 axially compressing the spring 41 and pivoting the lever 39 in a counterclockwise direction as viewed in FIGURE 1. The terminal end of the lever 39 is provided with a contact bar 42 which is electrically insulated from the lever 39. Supported within the housing 32 and electrically insulated from each other and the housing 32 are a pair of electric contacts 43, 44 which are positioned in the path of pivotal movement of the contact bar 42. As shown in FIGURE 1 when the lever 39 is in the position corresponding to a vehicle speed of zero, the contact bar 42 bridges the contacts 43 and 44. However, as the vehicle speed reaches a certain predetermined value which is dependent upon the biasing action of the spring 41 the lever 39 is caused to pivot in a counterclockwise direction as viewed in FIGURE 1 and the contact bar 42 is moved out of engagement with the contacts 43 and 44.

The contact 44 is electrically connected to the blower motor 12 by a conductor 45 and the contact 43 in turn is electrically connected to a switch arm 46 by means of a conductor 47. The switch arm 46 as well as a cooperable switch arm 48 are made of flexible spring-like material and are mounted in a block of dielectric within the housing 24 and are so arranged that a contact 49 carried by the arm 48 is resiliently urged into engagement with a contact 50 carried by the arm 46. A projection 51 fixed to the arm 48 is adapted to be engaged by the abutment 29 of the lever 21 to flex the arm 48 and maintain the contacts 49 and 50 separated when the control knob 25 is in its "off" position as shown in FIGURE 1. However, movement of the knob 25 to the right as viewed in FIGURE 1 to permit heated water to flow to the heat exchanger core allows the switch arm 48 to unflex and the contacts 49 and 50 to be moved into engagement with each other. As in conventional motor vehicle heating and ventilating systems, the electric power for operating the blower motor 12 is derived from a storage battery 52 or a generator (not shown) used to charge the battery. One terminal of the battery 52 is grounded and the other terminal thereof is electrically connected to a contact 53 of an ignition switch 54. The ignition switch 54 includes a manually movable arm 55 which is movable into engagement with the contact 53 to complete an electric circuit therethrough. A conductor 56 leads from the movable ignition switch arm 55 to a movable arm 57 of a manually operable blower motor control switch designated generally by numeral 58. Switch 58 is a three position switch and the arm 57 can be selectively positioned to engage any one of three switch contacts 59, 60 and 61. Suitable indicia visible to the vehicle operator is provided for indicating the particular position the arm 57 is in. Switch contact 59, designated the high speed contact, is electrically connected to the high speed winding of the electric motor 12 by means of a conductor 62 and similarly switch contact 60, designated the low speed contact, is electrically connected to conductor 45 by a conductor 63. The conductor 45, in turn, is connected to the low speed winding of the electric motor 12. The "automatic" switch contact 61, on the other hand, is electrically connected to the switch arm 48 by means of a conductor 64.

From the foregoing it is believed the operation of the means for controlling the operation of the blower is apparent. The switch arm 57 of blower control switch 58 is normally positioned to engage the "automatic" contact 61 and is left in that position except when it is desirous of operating the blower motor 12 independently of the vehicle speed and the temperature setting of the thermostatically-controlled valve 19. If such is the case the switch arm 57 is moved to contact the low speed contact 60 or the high speed contact 59 depending upon the volume of air it is desired to have discharged from the duct 15. Assuming, the switch arm 57 is contacting the "automatic" switch contact 61 and the motor vehicle is stopped or travelling at a speed inadequate for the proper circulation of air in the car body through the duct 15 and the air temperature without the vehicle body is such that the temperature of the air within the vehicle body is not required to be heated, the contact bar 42 bridges the contacts 43 and 44 and the contacts 49 and 50 are separated as shown in FIGURE 1. The blower 11 will not operate inasmuch as the circuit for energizing the blower motor 12 is not completed.

When the weather is such that heating of the interior of the vehicle body is desired, the lever 21 is moved from the "off" position shown in FIGURE 1 to set the thermostatically-controlled valve 19 to permit heated water to flow from the engine through the heat exchanger core. The position of the arm 21 with respect to its "off" position depends upon the rate of heating desired. In any event as soon as the arm 21 is moved from its "off" position the arm 48 unflexes and the contacts 49 and 50 are resiliently urged into engagement with each other. With the thermostatically-controlled valve 19 set to deliver heated water to the heat exchanger core and the blower control switch arm 57 in its "automatic" position the operation of the blower 10 is dependent entirely upon the rate of flow of air entering the air scoop 10 which in turn is dependent upon the velocity or forward ground speed of the motor vehicle. As stated hereinbefore when the vehicle is at rest or travelling at low speeds the contact bar 42 bridges the contacts 43 and 44. Thus the blower is energized and forces air through the heat exchanger housing 14 and the heated air is discharged into the interior of the vehicle body through the duct 15. When the motor vehicle attains a sufficient predetermined forward speed such that the velocity pressure of the air entering the air scoop 10 is adequate for proper circulation of the air in the vehicle body independently of the blower 11, the sleeve 37 will move vertically, as viewed in FIGURE 1, by the centrifugal force acting on the ball weights 35, causing the lever 39 to pivot moving contact bar 42 out of engagement with contacts 43 and 44. Thus, the electrical energizing circuit for the blower motor 12 is interrupted and the blower 11 will cease operating. In the event that the vehicle should slow down or come to a standstill the spring 40 will pivot the lever 39 in a clockwise direction, as viewed in FIGURE 1, causing the contact bar 42 to again bridge the contacts 43 and 44, and complete the electrical energizing circuit for the blower motor 12.

From the foregoing it will be appreciated that with applicant's blower control system the vehicle operator is relieved of the vexatious task of manually operating the blower control switch to turn the blower on each time the vehicle speed is reduced below the speed necessary to assure adequate air circulation within the operator's compartment and to thereafter turn the blower off when the vehicle is being driven above such speed. However, the vehicle operator may override automatic operation of the blower by merely moving the switch arm 57 to engage either the low speed contact 60 or the high speed contact 59.

The embodiment of the invention chosen for the purposes of illustration and description herein is that preferred for achieving the objects of the invention and developing utility thereof in the most desirable manner due regard being had to existing factors of economy, simplicity of design and construction and the improvements sought to be effected. It will be appreciated therefore that the particular structural and functional aspects emphasized herein are not intended to exclude, but rather to suggest, other adaptations and modifications of the invention as fall within the spirit and scope of the invention as defined in the appended claims.

What is claimed is:

1. A blower control means for a motor vehicle heating and ventilating system comprising a heat exchanger including a housing having a core therein and inlet and outlet air openings in the wall of said housing; conduit means for circulating a heat-containing medium through said core; valve means in said conduit means for controlling the rate of flow of a heat-containing fluid flowing through said core, manually operable valve positioning means for adjusting the condition of said valve means; a blower having its outlet side in communication with said housing inlet opening and its inlet side arranged to have air forced therein upon forward movement of the motor vehicle; a two speed electric motor drivingly connected to said blower; a source of electrical power; a three position manually operable selector switch operatively connected to said source of electrical power, said switch having a "high speed" contact, a "low speed" contact, and an "automatic" contact; a "low speed" electric line electrically interconnecting said "low speed" contact and said motor; a "high speed" electric line electrically interconnecting said "high speed" contact and said motor; and an "automatic" line electrically interconnecting said "automatic" contact and said motor; a speed responsive switch connected in series with said "automatic" line, said switch being closed when the motor vehicle speed is below a predetermined value and open when the vehicle speed exceeds said predetermined value; and a second switch connected in series with said "automatic" line operatively connected to said manually operable valve positioning means for adjusting the condition of said valve positioning means, said second switch being opened when said valve positioning means is in a position corresponding to the closed condition of said valve means and being closed in all other adjusted positions of said valve positioning means.

2. A blower control means for a motor vehicle heating and ventilating system comprising a heat exchanger including a housing having a core therein and inlet and outlet air openings in the wall of said housing; conduit means for circulating a heat-containing fluid through said core; a valve in said conduit means for controlling the rate of flow of the heat-containing fluid flowing through said core; manually operable valve positioning means for adjusting the condition of said valve; a blower having its outlet side in communication with said housing inlet opening and its inlet side arranged to have air forced therein upon forward movement of the motor vehicle; an electric motor drivingly connected to said blower; an automatic electric circuit for energizing said motor; a speed responsive switch in said circuit, said switch being closed when the motor vehicle speed is below a predetermined value and open when the vehicle speed exceeds said predetermined value; and a second switch in said circuit operatively connected to said manually operable valve positioning means for adjusting the condition of said valve, said second switch being opened when said valve positioning means is in a position corresponding to the closed condition of said valve and being closed in all other adjusted positions of said valve positioning means.

3. A blower control means for a motor vehicle heating and ventilating system comprising a heat exchanger including a housing having a core therein and inlet and outlet air openings in the wall of said housing, said inlet opening being arranged to have air forced therethrough upon forward movement of the motor vehicle; conduit means for circulating a heat-containing fluid through said core; valve means in said conduit means for controlling the rate of flow of a heat-containing fluid flowing through said core; manually operable valve positioning means for adjusting the condition of said valve means; a blower having its outlet side in communication with said housing inlet opening; an electric motor drivingly connected to said blower; an electric circuit for energizing said motor; and a switch in said circuit operably connected to said manually operable valve positioning means for adjusting the condition of said valve means, said switch being opened when said valve positioning means is in a position corresponding to the closed condition of said valve means and being closed in all other adjusted positions of said valve positioning means.

4. A blower control means for a motor vehicle heating and ventilating system comprising a heat exchanger including a housing having a core therein and inlet and outlet air openings in the wall of said housing, conduit means for circulating a heat-containing fluid through said core; a valve in said conduit means for controlling the rate of flow of the heat-containing fluid flowing through said core; manually operable valve positioning means for adjusting the condition of said valve; a blower having its outlet side in communication with said housing inlet opening and its inlet side arranged to have air forced therein upon forward movement of the motor vehicle; an electric motor drivingly connected to said blower; an automatic electric circuit for energizing said motor; a speed responsive switch in said circuit, said switch being closed when the motor vehicle speed is below a predetermined value and open when the vehicle speed exceeds said predetermined value; a second switch in said circuit operatively connected to said manually operable valve positioning means for adjusting the condition of said valve, said second switch being opened when said valve positioning means is in a position corresponding to the closed condition of said valve means and being closed in all other adjusted positions of said valve positioning means; a second electric circuit for energizing said motor, said second electric circuit including a portion of said automatic electric circuit; and a manually operable third switch in said automatic electric circuit and said second electric circuit for selectively disabling a portion of said automatic electric circuit which contains said speed responsive switch and said second switch and for energizing said motor through said second electric circuit independently of the condition of said speed responsive and second switches.

5. A blower control means for a motor vehicle heating and ventilating system comprising a heat exchanger including a housing having a core therein and inlet and outlet air openings in the wall of said housing, said inlet opening being arranged to have air forced therethrough upon forward movement of the motor vehicle; conduit means for circulating a heat-containing fluid through said core; valve means in said conduit means for controlling the rate of flow of said heat-containing fluid through said core; manually operable valve positioning means for adjusting the condition of said valve means; a blower having its outlet side in communication with said housing inlet opening; an electric motor drivingly connected to said blower; a first electric circuit for energizing said motor; a switch in said circuit operatively connected to said manually operable valve positioning means for adjusting the condition of said valve means, said switch being opened when said valve positioning means is in a position corresponding to the closed condition of said valve means and being closed in all other adjusted positions of said valve positioning means; a second electric circuit for energizing said motor including a portion of said first electric circuit; and a manually operable switch means in said first and second electric circuits for selectively disabling a portion of said first electric circuit which contains said first-mentioned switch and for energizing said motor through said second electric circuit independently of the condition of said first-mentioned switch.

References Cited in the file of this patent

UNITED STATES PATENTS

| | | |
|---|---|---|
| 2,291,543 | Findley | July 28, 1942 |
| 2,602,878 | Holody | July 8, 1952 |
| 2,634,670 | Simons | Apr. 14, 1953 |
| 2,672,294 | Crockett | Mar. 16, 1954 |

FOREIGN PATENTS

| | | |
|---|---|---|
| 783,757 | Great Britain | Sept. 25, 1957 |